United States Patent
Min et al.

(10) Patent No.: US 7,271,520 B2
(45) Date of Patent: Sep. 18, 2007

(54) PIEZO ACTUATOR DRIVING CIRCUIT

(75) Inventors: Byoung Own Min, Suwon (KR); Chang Woo Ha, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/435,745

(22) Filed: May 18, 2006

(65) Prior Publication Data

US 2007/0008357 A1  Jan. 11, 2007

(30) Foreign Application Priority Data

Jul. 11, 2005 (KR) .................. 10-2005-0062052

(51) Int. Cl.
*H01L 41/09* (2006.01)
(52) U.S. Cl. .................. 310/316.03; 310/315; 310/317
(58) Field of Classification Search ......... 310/315–317
See application file for complete search history.

(56) References Cited

U.S. PATENT DOCUMENTS 6,781,472 B2 * 8/2004 Watanabe .................. 331/176

2006/0001329 A1 * 1/2006 Rao et al. .................. 310/315

FOREIGN PATENT DOCUMENTS

| JP | 2003-37984 A | | 2/2003 |
| JP | 2005-237144 | * | 9/2005 |
| KR | 100172358 B1 | | 10/1998 |
| KR | 2002-0087269 A | | 11/2002 |

* cited by examiner

*Primary Examiner*—Thomas M. Dougherty
(74) *Attorney, Agent, or Firm*—Lowe Hauptman Ham & Berner

(57) ABSTRACT

The present invention relates to a piezo actuator driving circuit. The piezo actuator driving circuit includes a pulse generator that generates a first voltage pulse with a constant period; a first driver stage that receives the first voltage pulse of the pulse generator and buffers the first voltage pulse to output; a second driver stage that converts the first voltage pulse, buffered and output in the first driver stage, into a first current pulse to output; a driving voltage maintaining section that is connected to the pulse generator and the second driver stage so as to output a second current pulse for maintaining a constant amplitude of driving voltage pulse; and a piezo actuator that is connected to the second driver stage and the driving voltage maintaining section so as to be charged and discharged by the first and second current pulses and that is driven by the driving voltage pulse with a constant amplitude.

18 Claims, 5 Drawing Sheets

[FIG. 1]
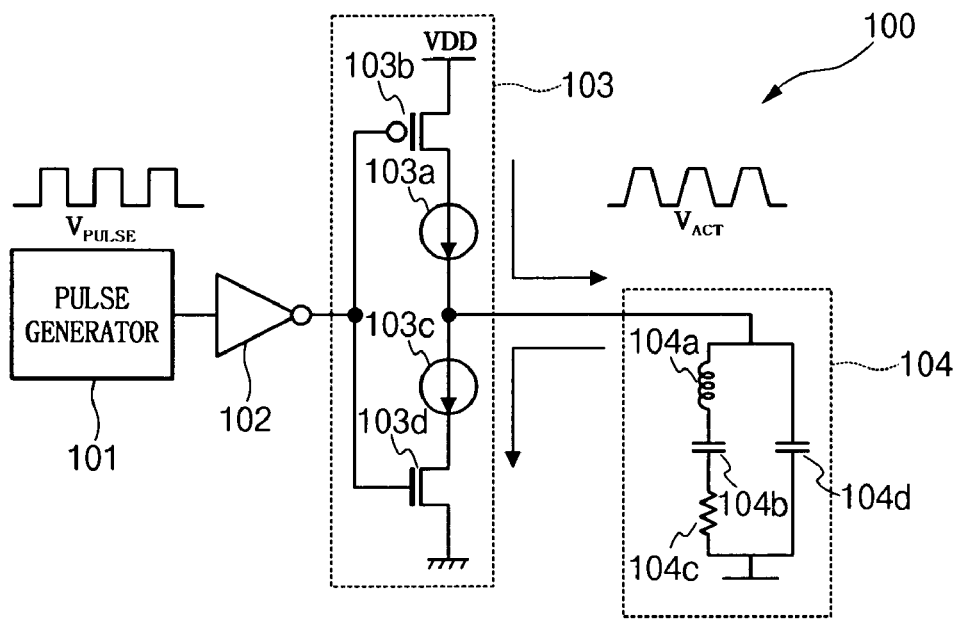
[FIG. 2]
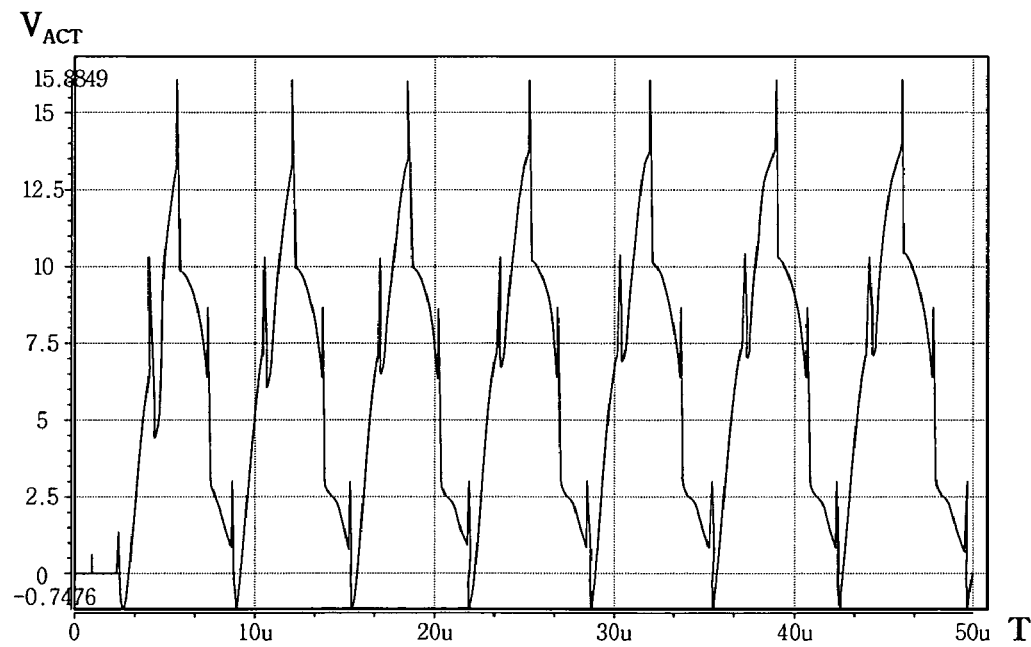

[FIG. 3]
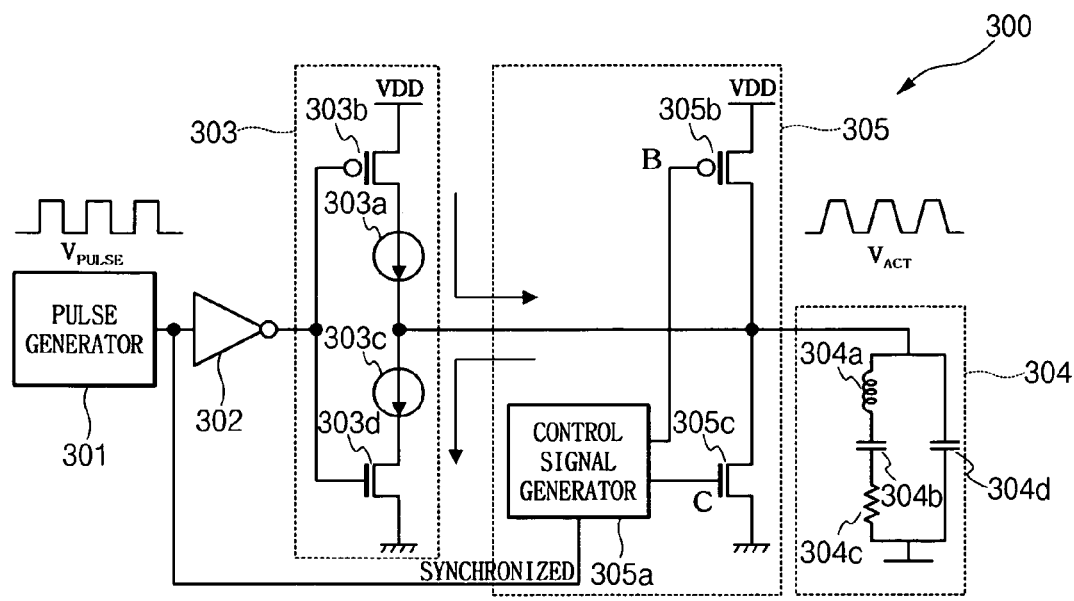

[FIG. 4A]
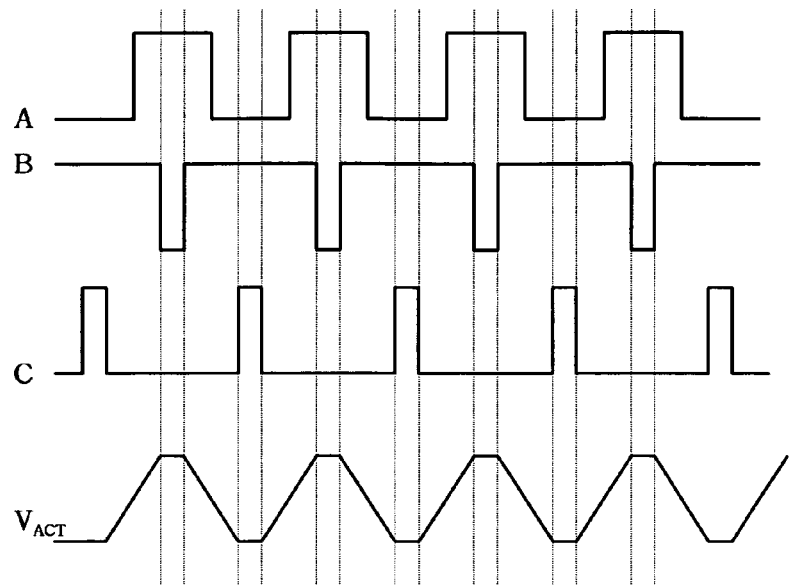
[FIG. 4B]
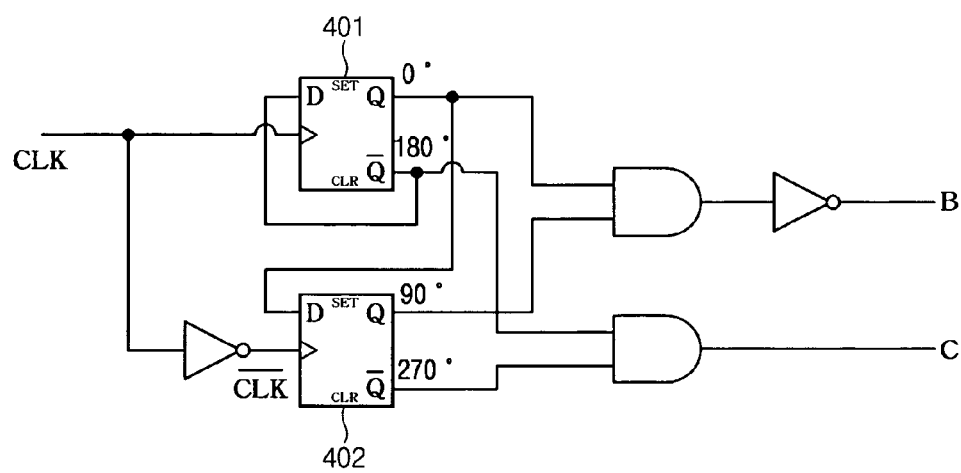

[FIG. 4C]
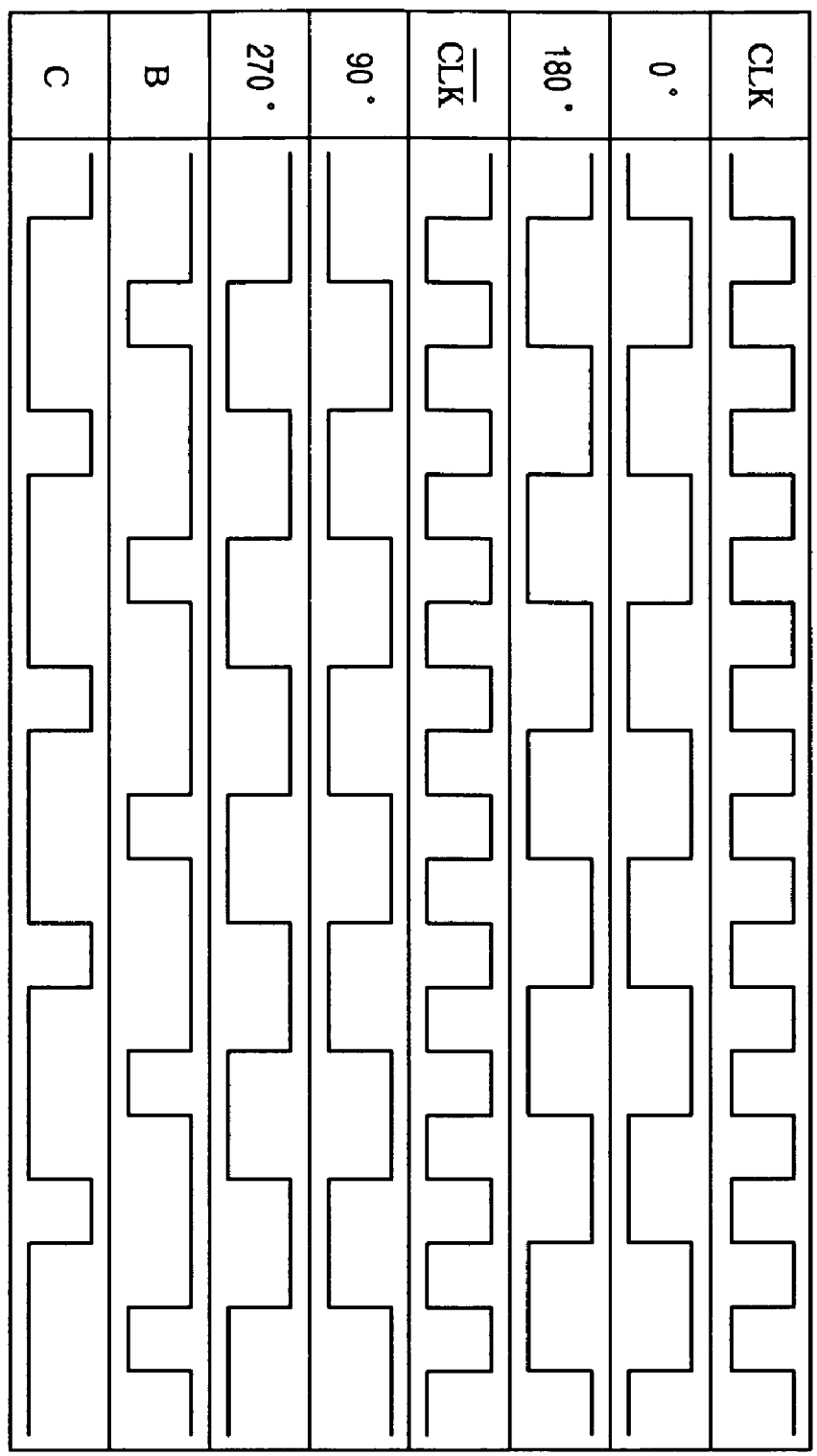

[FIG. 5]
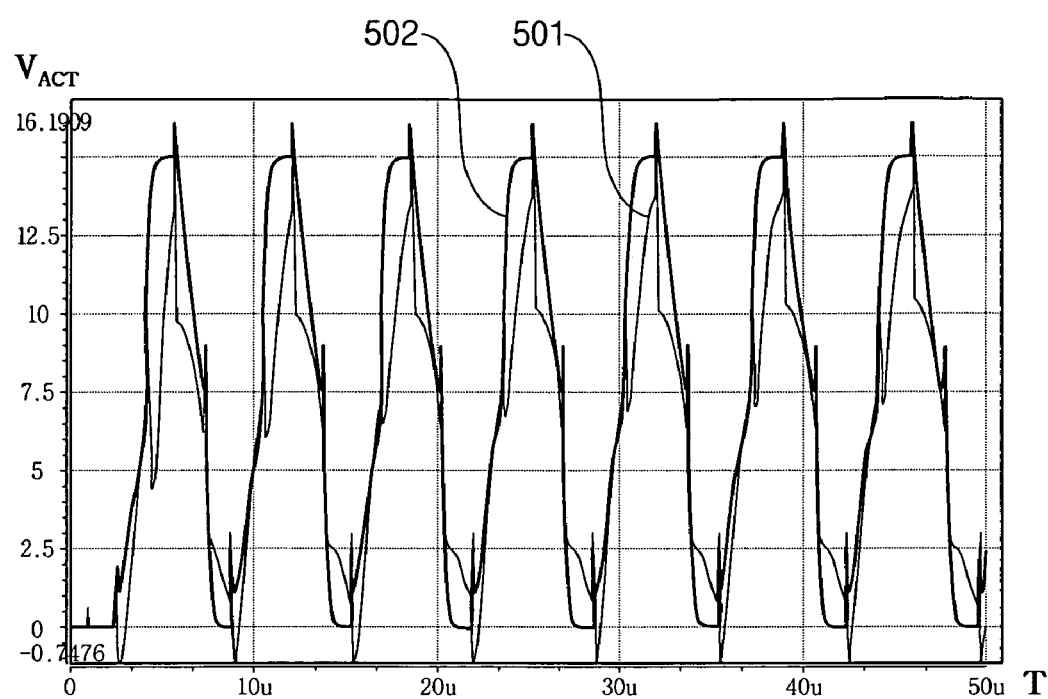

PIEZO ACTUATOR DRIVING CIRCUIT

CROSS-REFERENCE TO RELATED APPLICATIONS

The application claims the benefit of Korea Patent Application No. 2005-0062052 filed with the Korea Industrial Property Office on Jul. 11, 2005, the disclosure of which is incorporated herein by reference.

BACKGROUND OF THE INVENTION

1. Field of the Invention

The present invention relates to a piezo actuator driving circuit, and more specifically, to a piezo actuator driving circuit which not only can prevent signal distortion caused by process variation or temperature change occurring at the time of manufacturing a piezo actuator, but also can maintain a driving voltage so as to prevent a piezo actuator from malfunctioning or stopping, by adding a driving voltage maintaining section transmitting a current pulse to a piezo actuator.

2. Description of the Related Art

The current mobile phone market rapidly grows more than 20% every year. Recently, it is required to develop a mobile phone having various functions added thereto as well as a function of transmitting voice.

Accordingly, such functions as a camera, PDA, MP3 player, media player and the like are added, and mobile phones corresponding to 40% of the overall mobile phones support a camera function. Current mobile phones mainly adopt a 350 thousand pixel camera, but more and more mobile phones have a mega pixel camera mounted thereon. Recently, as 5 mega pixel and 7 mega pixel cameras are consecutively launched, a function of a camera module for mobile phone is also being enhanced. Particularly, as the direct competition with a digital camera is expected, an automatic focus function and automatic optical zoom function are required. In order to meet such requirements, it is urgent to implement a lens driving actuator and driver LSI which have low power consumption and are small in size. Recently, such a technique as a lens driving method using a piezo element attracts attention.

In the driving method using a piezo element, noise and vibration does not occur at all and power consumption can be significantly reduced to ⅓, in comparison with a conventional driving method using a motor.

In order to drive such a piezo element, an accurate resonant frequency should be set, and a constant amplitude of driving voltage should be maintained. In general, however, the load capacitance of a piezo element is as large as hundreds of pF and process variation is also large, which can cause signal distortion and malfunction of an actuator.

FIG. 1 is a circuit diagram showing a piezo actuator driving circuit 100 according to the related art. As shown in FIG. 1, the conventional piezo actuator driving circuit 100 is composed of a pulse generator 100 which generates a voltage pulse $V_{PULSE}$ with a constant period, a first driver stage 102 which receives the voltage pulse $V_{PULSE}$ of the pulse generator 101 and buffers the voltage pulse $V_{PULSE}$ to output, a second driver stage 103 which converts the voltage pulse $V_{PULSE}$, buffered and output in the first driver stage 102, into a current pulse to output, and a piezo actuator 104 which is connected to the second driver stage 103 so as to be charged and discharged by the second driver stage 103 and is driven by a constant amplitude of driving voltage pulse $V_{ACT}$.

Here, the first driver stage 102, which is composed of a buffering inverter, serves to buffer the voltage pulse $V_{PULSE}$ generated by the pulse generator 101.

The second driver stage 103 is composed of a first current source 103a to which a current pulse is transmitted to charge the piezo actuator 104, a first switching element 103b which receives the voltage pulse $V_{PULSE}$ of the pulse generator 101 and is connected to a power supply voltage VDD and the first current source 103a, a second current source 103c to which a current pulse is transmitted to discharge the piezo actuator 104, and a second switching element 103d which receives the voltage pulse $V_{PULSE}$ of the pulse generator 101 and is connected to a ground voltage and the second current source 103c.

Here, the first switching element 103b is a PMOS transistor, and the second switching element 103d is an NMOS transistor. The first and second switching elements 103b and 103d are turned on or off according to the voltage pulse $V_{PULSE}$ applied by the pulse generator 101 so as to generate a current pulse for driving the piezo actuator 104.

The piezo actuator 104 can be modeled by a resistance, an inductor, and a capacitor element. The piezo actuator 104 includes an inductor stage composed of an inductor 104a, a first capacitor 104b, and a resistance 104c, which are connected in series; and a second capacitor which is connected in parallel to the inductor stage so as to resonate and is charged and discharged by the current pulse generated by the second driver stage 103 so as to maintain a constant amplitude of driving voltage pulse $V_{ACT}$.

The conventional piezo actuator driving circuit 100 shown in FIG. 1 operates as follows.

First, if the pulse generator 101 generates a voltage pulse $V_{PULSE}$ with the resonant frequency of the piezo actuator, the generated voltage pulse $V_{PULSE}$ is buffered through the first driver stage 102 so as to be transmitted to the second driver stage 103.

When the voltage pulse $V_{PULSE}$ generated by the pulse generator 101 is low, the first switching element 103b of the second driver stage 103 is turned on to transmit a current signal to the piezo actuator 104. Then, the second capacitor 104d of the piezo actuator 104 is charged to increase a voltage $V_{ACT}$ which can drive the piezo actuator 104.

On the contrary, when the voltage pulse $V_{PULSE}$ generated by the pulse generator 101 is high, the second switching element 103d of the second driver stage 103 is turned on to transmit a current signal to the piezo actuator 104. Then, the second capacitor 104d of the piezo actuator 104 is discharged to decrease a voltage $V_{ACT}$ which can drive the piezo actuator 104.

However, in the conventional piezo actuator driving circuit, the piezo element used in a conventional camera module has large variation in resistance, inductor, and capacitor at the time of mass production, and a change due to the temperature is also large. Therefore, the load impedance, or specifically, the load capacitance easily changes.

FIG. 2 is a diagram showing an output signal waveform of the conventional piezo actuator driving circuit. As shown in FIG. 2, when the load capacitance changes due to process variation or temperature change, the resonant frequency of the piezo actuator also changes. Therefore, a signal waveform desired by a user cannot be obtained with a current signal generated at the initially-set resonant frequency.

As an amount of current generated at the initially-set resonant frequency becomes insufficient due to process variation or temperature change, the driving voltage $V_{ACT}$ decreases (to 7.5V), as shown in FIG. 2. Then, the piezo actuator cannot be driven, or can malfunction.

SUMMARY OF THE INVENTION

An advantage of the present invention is that it provides a piezo actuator driving circuit which not only can prevent signal distortion caused by process variation or temperature change occurring at the time of manufacturing a piezo actuator, but also can maintain a driving voltage so as to prevent a piezo actuator from malfunctioning or stopping, by adding a driving voltage maintaining section transmitting a current pulse to a piezo actuator.

Additional aspects and advantages of the present general inventive concept will be set forth in part in the description which follows and, in part, will be obvious from the description, or may be learned by practice of the general inventive concept.

According to an aspect of the invention, a piezo actuator driving circuit includes a pulse generator that generates a first voltage pulse with a constant period; a first driver stage that receives the first voltage pulse of the pulse generator and buffers the first voltage pulse to output; a second driver stage that converts the first voltage pulse, buffered and output in the first driver stage, into a first current pulse to output; a driving voltage maintaining section that is connected to the pulse generator and the second driver stage so as to output a second current pulse for maintaining a constant amplitude of driving voltage pulse; and a piezo actuator that is connected to the second driver stage and the driving voltage maintaining section so as to be charged and discharged by the first and second current pulses and that is driven by the driving voltage pulse with a constant amplitude.

The first driver stage is a buffering inverter.

The second driver stage includes a first current source to which the first current pulse is transmitted to charge the piezo actuator; a first switching element that receives the first voltage pulse of the pulse generator and is connected to a power supply voltage and the first current source; a second current source to which the first current pulse is transmitted to discharge the piezo actuator; and a second switching element that receives the first voltage pulse of the pulse generator and is connected to a ground voltage and the second current source.

The first switching element is a PMOS transistor, and the second switching element is an NMOS transistor.

The gate of the PMOS transistor receives the first voltage pulse of the pulse generator, the source thereof receives a power supply voltage, and the drain thereof is connected to the first current source.

The gate of the NMOS transistor receives the first voltage pulse of the pulse generator, the source thereof is connected to a ground voltage, and the drain thereof is connected to the second current source.

When the first voltage pulse of the pulse generator is low, the PMOS transistor is turned on to charge the piezo actuator.

When the first voltage pulse of the pulse generator is high, the NMOS transistor is turned on to discharge the piezo actuator.

The driving voltage maintaining section includes a control signal generator that is connected to the pulse generator and outputs second and third voltage pulses in synchronization with the first voltage pulse of the pulse generator; a third switching element that receives the second voltage pulse of the control signal generator and is connected to a power supply voltage; and a fourth switching element that receives the third voltage pulse of the control signal generator and is connected to a ground voltage and the third switching element.

The third switching element is a PMOS transistor, and the fourth switching element is an NMOS transistor.

The gate of the PMOS transistor receives the second voltage pulse of the control signal generator, the source thereof receives a power supply voltage, and the drain thereof is connected to the fourth switching element.

The gate of the NMOS transistor receives the third voltage pulse of the control signal generator, the source thereof is connected to a ground voltage, and the drain thereof is connected to the third switching element.

When a constant amplitude of driving voltage pulse is not maintained, the control signal generator generates a low-state second voltage pulse in a state where the first voltage pulse is high.

When a constant amplitude of driving voltage pulse is maintained, the control signal generator generates a high-state third voltage pulse in a state where the first voltage pulse is low.

When the second voltage pulse of the control signal generator is low, the PMOS transistor is turned on to charge the piezo actuator.

When the third voltage pulse of the control signal generator is high, the NMOS transistor is turned on to discharge the piezo actuator.

The piezo actuator includes an inductor stage composed of an inductor, a first capacitor, and a resistance, which are connected in series; and a second capacitor that is connected in parallel to the inductor stage so as to resonate and is charged and discharged by the first and second current pulses so as to maintain the driving voltage pulse with a constant amplitude.

The amplitude of the driving voltage pulse is equal to or more than 10 peak voltage.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram showing a piezo actuator driving circuit according to the related art;

FIG. 2 is a diagram showing a output signal waveform of the piezo actuator driving circuit according to the related art;

FIG. 3 is a circuit diagram showing a piezo actuator driving circuit according to the present invention;

FIG. 4A is a diagram showing waveforms of first, second, and third voltage pulses generated by a control signal generator and a waveform of a driving voltage pulse according to the invention;

FIG. 4B is a logic circuit diagram showing the internal construction of the control signal generator according to the invention;

FIG. 4C is a diagram showing signal waveforms generated in the logic circuit diagram; and FIG. 5 is a diagram comparatively showing an output signal waveform of the piezo actuator driving circuit according to the related art and an output signal waveform of the piezo actuator driving circuit according to the present invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

FIG. 3 is a circuit diagram showing a piezo actuator driving circuit 300 according to the present invention. As shown in FIG. 3, the piezo actuator driving circuit 300 is composed of a pulse generator 310 which generates a first voltage pulse $V_{PULSE}$ with a constant period, a first driver stage 302 which receives the first voltage pulse $V_{PULSE}$ of the pulse generator 301 and buffers the first pulse $V_{PULSE}$ to output, a second driver stage 303 which converts the first pulse $V_{PULSE}$, buffered and output by the first driver stage, into a first current pulse to output, a driving voltage maintaining section 305 which is connected to the pulse generator 301 and the second driver stage 303 so as to output a second current pulse for maintaining a constant amplitude of driving voltage pulse, and a piezo actuator 304 which is connected to the second driver stage 303 and the driving voltage maintaining section 305 so as to be charged and discharged by the first and second current pulses and is driven by the driving voltage pulse with a constant amplitude.

Here, the first driver stage 302, which is composed of a buffering inverter, serves to buffer the voltage pulse $V_{PULSE}$ generated by the pulse generator 301.

The second driver stage 303 is composed of a first current source 303a to which the first current pulse is transmitted to charge the piezo actuator 304, a first switching element 303b which receives the first voltage pulse $V_{PULSE}$ of the pulse generator 301 and is connected to a power supply voltage VDD and the first current source 303a, a second current source 303c to which the first current source is transmitted to discharge the piezo actuator 304, and a second switching element which receives the voltage pulse $V_{PULSE}$ of the pulse generator 301 and is connected to a ground voltage and the second current source 303c.

Here, the first switching element 303b is a PMOS transistor, and the second switching element 303d is an NMOS transistor. The first and second switching elements 303b and 303d are turned on or turned off according to the first voltage pulse $V_{PULSE}$ applied by the pulse generator 301 so as to generate the first current pulse for driving the piezo actuator 304.

The gate of the PMOS transistor 303b receives the first voltage pulse $V_{PULSE}$ of the pulse generator 301, the source thereof receives a power supply voltage VDD, and the drain thereof is connected to the first current source 303a.

The gate of the NMOS transistor 303d receives the first voltage pulse $V_{PULSE}$ of the pulse generator 301, the source thereof is connected to the ground voltage, and the drain thereof is connected to the second current source 303c.

The piezo actuator 304, which can be modeled by a resistance, an inductor, and a capacitor passive element, is composed of an inductor stage including an inductor 304a, a first capacitor 304b, and a resistance 304c, which are connected in series, and a second capacitor 304d which is connected in parallel to the inductor stage so as to resonate and is charged and discharged by the current pulse generated by the second driver stage 303 and the driving voltage maintaining section 305 so as to maintain a constant amplitude of driving voltage pulse $V_{ACT}$.

The driving voltage maintaining section 305 is composed of a control signal generator 305a which is connected to the pulse generator 301 so as to generate second and third voltage pulses B and C synchronized with the first voltage pulse $V_{PULSE}$ of the pulse generator 301, a third switching element 305b which receives the second voltage pulse B of the control signal generator 305a and is connected to a power supply voltage, and a fourth switching element 305c which receives the third voltage pulse C of the control signal generator 305a and is connected to a ground voltage and the switching element 305b.

The third switching element 305b is a PMOS transistor, and the fourth switching element 305c is an NMOS transistor.

The gate of the PMOS transistor 305b receives the second pulse B of the control signal generator 305a, the source thereof receives a power supply voltage VDD, and the drain thereof is connected to the fourth switching element 305c. The gate of the NMOS transistor 305c receives the third voltage pulse C of the control signal generator 305a, the source thereof is connected to a ground voltage, and the drain thereof is connected to the third switching element 305b.

The control signal generator 305a generates a low-state second voltage pulse B or high-state third voltage pulse C in synchronization with the first voltage pulse $V_{PULSE}$ generated by the pulse generator 301.

FIG. 4A is a diagram showing waveforms of the first, second, and third voltage pulse A, B, and C generated by the control signal generator and a waveform of the driving voltage pulse $V_{ACT}$ according to the present invention. As shown in FIG. 4A, if the driving voltage pulse $V_{ACT}$ cannot maintain such an amplitude that can drive the piezo actuator, the control signal generator 305a generates a low-state second voltage pulse B in a state where the first voltage pulse A is high.

Further, if the driving voltage pulse $V_{ACT}$ maintains such an amplitude that can drive the piezo actuator, the control signal generator 305a generates a high-state third voltage pulse C in a state where the first voltage pulse A is low.

As the above-described first, second, and third voltage pulses A, B, and C are synchronized with each other, the driving voltage pulse $V_{ACT}$ with the waveform shown in FIG. 4a can be secured by an operation to be described below, thereby driving the piezo actuator.

Here, the amplitude of the driving voltage pulse $V_{ACT}$ which can drive the piezo actuator should be at least 10 peak voltage. When an amplitude of 10 peak voltage is not secured, the piezo actuator does not operate or can malfunction.

FIG. 4B is a logic circuit diagram showing the internal construction of the control signal generator 305a according to the present invention, and FIG. 4C is a diagram showing a signal waveform generated in the logic circuit diagram shown in FIG. 4B.

As shown in FIG. 4B, the control signal generator is composed of flip flops 401 and 402 and a NAND gate. When the first voltage pulse generated by the pulse generator is applied to the flip flops 401 and 402, the flip flops 401 and 402 converts the first voltage pulse into such signal waveforms as shown in FIG. 4C so as to generate the second and third voltage pulses B and C, which are applied to the third and fourth switching elements.

FIG. 5 is a diagram comparatively showing an output signal waveform of the piezo actuator driving circuit 300 according to the invention and an output signal waveform of a conventional piezo actuator driving circuit. As shown in FIG. 5, the distortion of the output signal of the piezo actuator driving circuit 300 according to the invention is not as severe as that of the output signal of the conventional piezo actuator driving circuit. Further, the output signal voltage of the piezo actuator driving circuit according to the invention is about 15V, which means that the amplitude for driving the actuator is also secured.

The piezo actuator driving circuit 300 according to the present invention, shown in FIG. 3, operates as follows.

First, when the pulse generator 301 generates a first voltage pulse $V_{PULSE}$ with a resonant frequency of the piezo actuator 304, the generated first voltage pulse $V_{PULSE}$ is buffered through the first driver stage 302 so as to be transmitted to the second driver stage 303.

When the first voltage pulse $V_{PULSE}$ generated by the pulse generator 301 is low, the first switching element 303b of the second driver stage 303 is turned on so as to transmit a current signal to the piezo actuator 304. Then, the second capacitor 304d of the piezo actuator 304 is charged to increase a voltage $V_{ACT}$ which can drive the piezo actuator 104. At this time, if such an amplitude that can generate the piezo actuator is maintained, the control signal generator 305a of the driving voltage maintaining section 305 generates a high-state third voltage pulse C in synchronization with the first voltage pulse $V_{PULSE}$. Then, the fourth switching element 305c is turned on to discharge the second capacitor 304d of the piezo actuator 304, so that the driving voltage pulse $V_{ACT}$ shown in FIG. 4A is secured.

On the contrary, when the first voltage pulse $V_{PULSE}$ generated by the pulse generator 301 is high, the second switching element 303d of the second driver stage 303 is turned on to transmit a current signal to the piezo actuator 104. Then, the second capacitor 304d of the piezo actuator 304 is discharged to decrease a voltage $V_{ACT}$ which can drive the piezo actuator 304. At this time, if such an amplitude that can drive the piezo actuator 304 is not maintained, the control signal generator 305a of the driving voltage maintaining section 305 generates a low-state second voltage pulse B in synchronization with the first voltage pulse $V_{PULSE}$. Then, the third switching element 305b is turned on to charge the second capacitor 304d of the piezo actuator 304, thereby securing a constant amplitude which can drive the piezo actuator 304.

As described above, the driving voltage maintaining section which transmits a current pulse to the piezo actuator is added to the piezo actuator driving circuit according to the present invention, which makes it possible to prevent signal distortion caused by temperature change or process variation occurring at the time of manufacturing a piezo actuator.

Further, a minimum driving voltage which can drive the piezo actuator is maintained to thereby prevent the piezo actuator from malfunctioning or stopping.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A piezo actuator driving circuit comprising:
   a pulse generator that generates a first voltage pulse with a constant period;
   a first driver stage that receives the first voltage pulse of the pulse generator and buffers the first voltage pulse to output;
   a second driver stage that converts the first voltage pulse, buffered and output in the first driver stage, into a first current pulse to output;
   a driving voltage maintaining section that is connected to the pulse generator and the second driver stage so as to output a second current pulse for maintaining a constant amplitude of driving voltage pulse; and
   a piezo actuator that is connected to the second driver stage and the driving voltage maintaining section so as to be charged and discharged by the first and second current pulses and that is driven by the driving voltage pulse with a constant amplitude.

2. The piezo actuator driving circuit according to claim 1, wherein the first driver stage is a buffering inverter.

3. The piezo actuator driving circuit according to claim 1, wherein the second driver stage includes:
   a first current source to which the first current pulse is transmitted to charge the piezo actuator;
   a first switching element that receives the first voltage pulse of the pulse generator and is connected to a power supply voltage and the first current source;
   a second current source to which the first current pulse is transmitted to discharge the piezo actuator; and
   a second switching element that receives the first voltage pulse of the pulse generator and is connected to a ground voltage and the second current source.

4. The piezo actuator driving circuit according to claim 3, wherein the first switching element is a PMOS transistor, and the second switching element is an NMOS transistor.

5. The piezo actuator driving circuit according to claim 4, wherein the gate of the PMOS transistor receives the first voltage pulse of the pulse generator, the source thereof receives a power supply voltage, and the drain thereof is connected to the first current source.

6. The piezo actuator driving circuit according to claim 4, wherein the gate of the NMOS transistor receives the first voltage pulse of the pulse generator, the source thereof is connected to a ground voltage, and the drain thereof is connected to the second current source.

7. The piezo actuator driving circuit according to claim 4, wherein, when the first voltage pulse of the pulse generator is low, the PMOS transistor is turned on to charge the piezo actuator.

8. The piezo actuator driving circuit according to claim 4, wherein, when the first voltage pulse of the pulse generator is high, the NMOS transistor is turned on to discharge the piezo actuator.

9. The piezo actuator driving circuit according to claim 1, wherein the driving voltage maintaining section includes:
   a control signal generator that is connected to the pulse generator and outputs second and third voltage pulses in synchronization with the first voltage pulse of the pulse generator;
   a third switching element that receives the second voltage pulse of the control signal generator and is connected to a power supply voltage; and
   a fourth switching element that receives the third voltage pulse of the control signal generator and is connected to a ground voltage and the third switching element.

10. The piezo actuator driving circuit according to claim 9, wherein the third switching element is a PMOS transistor, and the fourth switching element is an NMOS transistor.

11. The piezo actuator driving circuit according to claim 10, wherein the gate of the PMOS transistor receives the second voltage pulse of the control signal generator, the source thereof receives a power supply voltage, and the drain thereof is connected to the fourth switching element.

12. The piezo actuator driving circuit according to claim 10,
wherein the gate of the NMOS transistor receives the third voltage pulse of the control signal generator, the source thereof is connected to a ground voltage, and the drain thereof is connected to the third switching element.

13. The piezo actuator driving circuit according to claim 9,
wherein, when a constant amplitude of driving voltage pulse is not maintained, the control signal generator generates a low-state second voltage pulse in a state where the first voltage pulse is high.

14. The piezo actuator driving circuit according to claim 9,
wherein, when a constant amplitude of driving voltage pulse is maintained, the control signal generator generates a high-state third voltage pulse in a state where the first voltage pulse is low.

15. The piezo actuator driving circuit according to claim 13,
wherein, when the second voltage pulse of the control signal generator is low, the PMOS transistor is turned on to charge the piezo actuator.

16. The piezo actuator driving circuit according to claim 13,
wherein, when the third voltage pulse of the control signal generator is high, the NMOS transistor is turned on to discharge the piezo actuator.

17. The piezo actuator driving circuit according to claim 1,
wherein the piezo actuator includes:
an inductor stage composed of an inductor, a first capacitor, and a resistance, which are connected in series; and
a second capacitor that is connected in parallel to the inductor stage so as to resonate and is charged and discharged by the first and second current pulses so as to maintain the driving voltage pulse with a constant amplitude.

18. The piezo actuator driving circuit according to claim 1,
wherein the amplitude of the driving voltage pulse is equal to or more than 10 peak voltage.

* * * * *